United States Patent Office 3,694,279
Patented Sept. 26, 1972

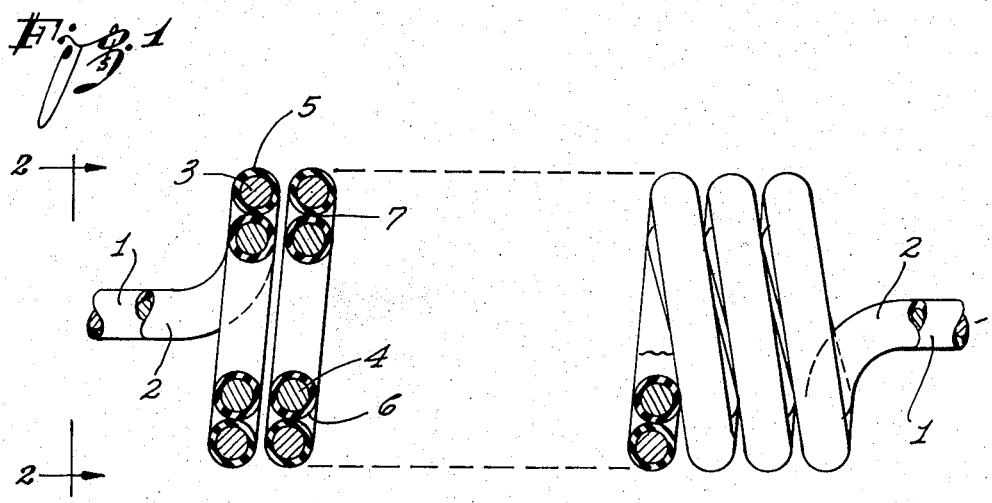
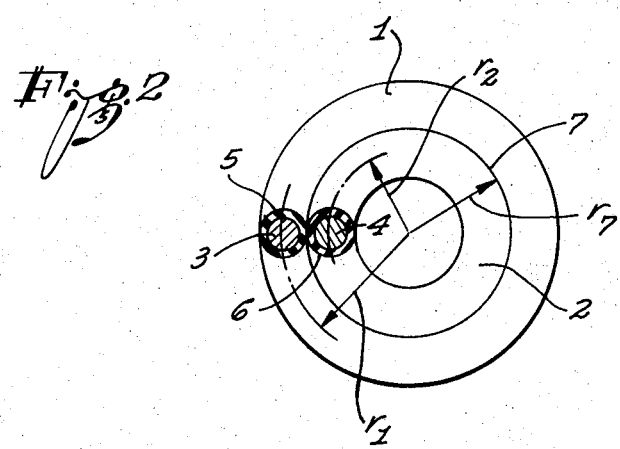

3,694,279
METHOD OF MAKING A RETRACTILE CORD
Herbert Rohrig, Schwarzenbruck, and Fritz Loy, Heroldsberg, Germany, assignors to Kabel- und Metallwerke Gutehoffnungshutte Aktiengesellschaft, Hannover, Germany
Filed Dec. 7, 1970, Ser. No. 95,609
Claims priority, application Germany, Dec. 13, 1969, P 19 62 536.6
Int. Cl. H01b 7/06, 13/00
U.S. Cl. 156—50    3 Claims

ABSTRACT OF THE DISCLOSURE

A retractile twin conductor cord of helical configuration is made so that one conductor is disposed radially displaced on top of the other, and their insulation sheathings are joined along a helix.

---

The present invention relates to a method of making a retractile twin conductor cord or cable, i.e. a twin conductor cable or cord is to be made in helically wound configuration so as to be capable of expansion and resilient contraction. The twin conductors are to be insulated from each other and interconnected by means of joining the insulation sheathing.

Retractile cords are used, for example, for connecting the telephone base or housing to the handset. Cords of this type have the particularly advantageous feature of occupying little space when retracted. On the other hand, the cord can be extended for several times its length when retracted. Retractile cords are not only used for telephones, but household appliances are also frequently equipped with retractile cords because long, regular cords are often quite annoying.

Household appliances are almost exclusively provided with twin conductor type cords and plugs for connection to the mains. It has been suggested to provide retractile type, twin conductors in that two wires are juxtaposed (but spaced-apart), and insulation sheathing is provided to cover both of them, and to provide insulation between them. The thusly combined conductors are wound helically so that the two conductors are positioned side by side along the helix. It is inherent in such a construction that the resulting helical cord does not provide for sufficiently strong retracting force. Thus, the extended cord will not completely retract unless provided with an additional resilient element. Moreover, it was found that such cord has an extension/retraction ratio not exceeding 3:1.

The problem solved by the present invention is to provide a method for making a retractile twin conductor cord that does not require additional elastic or resilient means for obtaining sufficient reversibility of extension. In accordance with the preferred embodiment of the invention, it is suggested to provide the two conductors as separate elements, including individual insulation sheathing. The outer surface of at least one of the insulated conductors, or at least a portion of such surface, is prepared with or as a bonding means. The two conductors are wound and joined so that one is disposed radially displaced on top of the other one, and they are joined along a helix to obtain retractability, particularly the two insulation sheathings are bonded together along that helix. Thus, the inner one of the conductors provides a helix having smaller diameter than the outer one, while the helix defined by the bonding line has in-between diameter.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a side elevation, partially as longitudinal section view of a retractile twin conductor cord, made in accordance with the preferred embodiment of the invention; and FIG. 2 is a view along line 2—2 in FIG. 1.

The illustrated twin conductor cord has insulated conductors 1 and 2, whereby the conductor cores are denoted with reference numerals 3 and 4. Conductors proper 3 and 4 may be established by solid or stranded wires, and they are respectively covered and lined with insulation sheathing 5 and 6. The material for the insulation is a conventional, resilient plastics.

As can be seen, the twin conductor cord is a retractile one as the conductors are particularly helically coiled. Conductor 2 provides an inner helix and the radius $r2$ thereof is defined by the radial distance of the center line of conductor 2 from the axis of the helix. Conductor 1 is wound thereon to establish a helix of larger diameter, having radius $r1$. The two helixes are disposed relative to each other in that conductor 1 is disposed on top of conductor 2, in radially outwardly displaced relation thereto. Reference numeral 7 denotes a helix along which conductors 1 and 2 are joined through bonding of the respective insulation sheathings 5 and 6. The helix 7, as defined by the bonding line, has in-between diameter (radius $r7$).

Upon practicing the inventive method, conductor 2 is wound first, for example, on a mandrel or the like, thereby establishing a helix. Next, a bonding agent may be applied onto and along the outwardly extending surface portion of that conductor 2. Next, conductor 1 is wound on top of conductor 2 and in engagement therewith; the line of engagement establishes helix 7. Additionally or in the alternative, bonding agent is applied to conductor 1. In either case, bonding material is effective along that line 7.

A bonding agent may not be needed, if the insulation sheathing of the two conductors consists of thermoplastic material. The two conductors are heated, particularly immediately preceding progressing engagement during winding one conductor onto the other one. The heating is to be effective, locally at least, to raise the temperature of the insulation above its softening point. Upon winding conductor 1 onto conductor 2, the two insulation layers thereof are locally fused along a helical line 7. In essence, the two insulation layers are bonded together by thermoplastic welding, causing the conductors 1 and 2 to join.

A retractile twin conductor cord made in this manner is inherently springy to such an extent that additional elastic elements are not needed. This is particularly due to the radial disposition of the two conductors relative to each other. It should be noted, that initially upon winding either conductor, stress is set up in the insulation thereof. However, the conductors are bonded in situ, i.e., when coiled, with bonding provided particularly along the newly established helix 7. The helical bonding zone per se is stress-relieved, so that upon hardening the helical configuration of the joined conductors is maintained. Note that due to the different curving of the two helical conductors and due to the helical line of bonding, the conductors are inhibited from straightening, as straightening would require lateral shifting of the conductors; they are inhibited from such shifting due to the curved bonding path. This, in turn, operates as strong retracting force upon axial extension of the twin helix as that involves twisting of the resilient insulation sheathing adjacent and along the bonding line. It was found, that a cord made in that manner has an extension/contraction ratio of up to 6:1. When compared with the 3:1 ratio of the known cords, this is a twofold improvement, i.e., for the same number of turns a cord made in accordance with the invention will occupy only half the space as it retracts more. Also, it was found that for the same maximum extension only half the material is needed as compared with known cords.

The invention is not limited to the embodiments described above but all changes and modifications thereof not constituting departures from the spirit and scope of the invention are intended to be included.

We claim:

1. Method of making a retractile twin conductor cord, comprising the steps of:

providing first and second insulated conductors;

preparing the surface of the insulation of at least one of the conductors for permitting the insulations of the conductors to be bonded together along a surface line on the insulation of each conductor, parallel to the respective center lines of the conductors;

providing the first conductor in helical configuration at a relatively small diameter for the resulting helix; and providing the second conductor in helical configuration of larger diameter for the resulting helix and directly on top of the first conductor helix in turn-for-turn, radially aligned relationship so that the two conductors are radially spaced-apart but in surface-to-surface contact as to their respective insulation, whereby the second insulated conductor becomes disposed radially outwardly on top of the first insulated conductor, the insulation of the conductors where mutually engaging along a helical line being bonded together due to said preparing and upon providing the second conductor in said helical configuration.

2. Method as in claim 1, the preparing step including heating the insulation of the two conductors to obtain fusion upon engagement along said helical line of engagement.

3. Method as in claim 1, the preparing step including applying a bonding agent onto at least one of the conductors.

References Cited

UNITED STATES PATENTS

| | | | |
|---|---|---|---|
| 3,100,240 | 8/1963 | McKirdy | 174—69 |
| 3,299,375 | 1/1967 | Thompson | 174—69 X |

ROBERT F. BURNETT, Primary Examiner

L. T. KENDELL, Assistant Examiner

U.S. Cl. X.R.

156—175, 306; 174—69